United States Patent
Porter

(10) Patent No.: US 12,333,336 B2
(45) Date of Patent: Jun. 17, 2025

(54) SCHEDULING AND CLOCK MANAGEMENT FOR REAL-TIME SYSTEM QUALITY OF SERVICE (QoS)

(71) Applicant: ATI TECHNOLOGIES ULC, Markham (CA)

(72) Inventor: Allen J. Porter, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 869 days.

(21) Appl. No.: 17/484,437

(22) Filed: Sep. 24, 2021

(65) Prior Publication Data
US 2023/0099950 A1  Mar. 30, 2023

(51) Int. Cl.
| G06F 9/48 | (2006.01) |
| G06F 1/08 | (2006.01) |
| G06F 1/324 | (2019.01) |
| G06F 1/329 | (2019.01) |
| G06F 9/50 | (2006.01) |

(52) U.S. Cl.
CPC .............. *G06F 9/4887* (2013.01); *G06F 1/08* (2013.01); *G06F 1/324* (2013.01); *G06F 1/329* (2013.01); *G06F 9/4881* (2013.01); *G06F 9/5038* (2013.01); *G06F 9/5044* (2013.01); *G06F 9/5055* (2013.01)

(58) Field of Classification Search
None
See application file for complete search history.

(56) References Cited

U.S. PATENT DOCUMENTS

| 5,640,563 | A | * | 6/1997 | Carmon | ................ G06F 9/4887 |
| | | | | | 718/102 |
| 8,310,492 | B2 | | 11/2012 | McCrary et al. | |
| 8,928,678 | B2 | | 1/2015 | Wang et al. | |
| 9,142,001 | B2 | | 9/2015 | Samson et al. | |
| 9,176,572 | B2 | | 11/2015 | Thomson et al. | |
| 9,875,135 | B2 | | 1/2018 | Piazza et al. | |
| 10,133,597 | B2 | | 11/2018 | Tian et al. | |

FOREIGN PATENT DOCUMENTS

| WO | WO-2011038214 A1 | * | 3/2011 | ........... G06F 1/3203 |
| WO | WO-2011120019 A2 | * | 9/2011 | ........... G06F 1/3206 |

* cited by examiner

*Primary Examiner* — Qing Yuan Wu

(57) ABSTRACT

Scheduling and clock management for real-time system quality of service (QoS) is disclosed. In an implementations, a resource manager determines a target work rate based on respective job deadlines of a plurality of jobs on a processing platform. Determining the target work rate can include ordering the plurality of jobs based on the respective deadlines, determining an amount of work required to reach each of the respective deadlines, identifying one deadline among the respective deadlines as a most constraining deadline based on the amount of work required to reach that one deadline, and determining the target work rate based on the most constraining deadline. The resource manager adjusts a clock rate of the processing platform based on at least the target work rate.

20 Claims, 8 Drawing Sheets

SCHEDULING AND CLOCK MANAGEMENT FOR REAL-TIME SYSTEM QUALITY OF SERVICE (QoS)

BACKGROUND

Managing power consumption in integrated circuits (ICs) such as computer processors and various types of system-on-a-chip (SoC) ICs is increasingly important. Reducing clock frequencies or gating clocks can reduce dynamic power consumption. Clock management mechanisms can be employed to control clock frequencies for the purposes of power management. Performance is another factor that must be considered in designing computers and other types of processor-based electronic systems. Generally, higher performance requires high clock frequencies, resulting in a higher amount of power consumed. Real-time tasks, such as those in multimedia playback or teleconferencing applications, require reliable performance to satisfy user experience objectives. For example, in multimedia playback application, successive video frames must be decoded and rendered on time, and audio must be synchronized, to avoid discontinuities in the playback. Processor schedulers can be employed to ensure that real-time tasks are completed on time.

DETAILED DESCRIPTION

Figure 1:
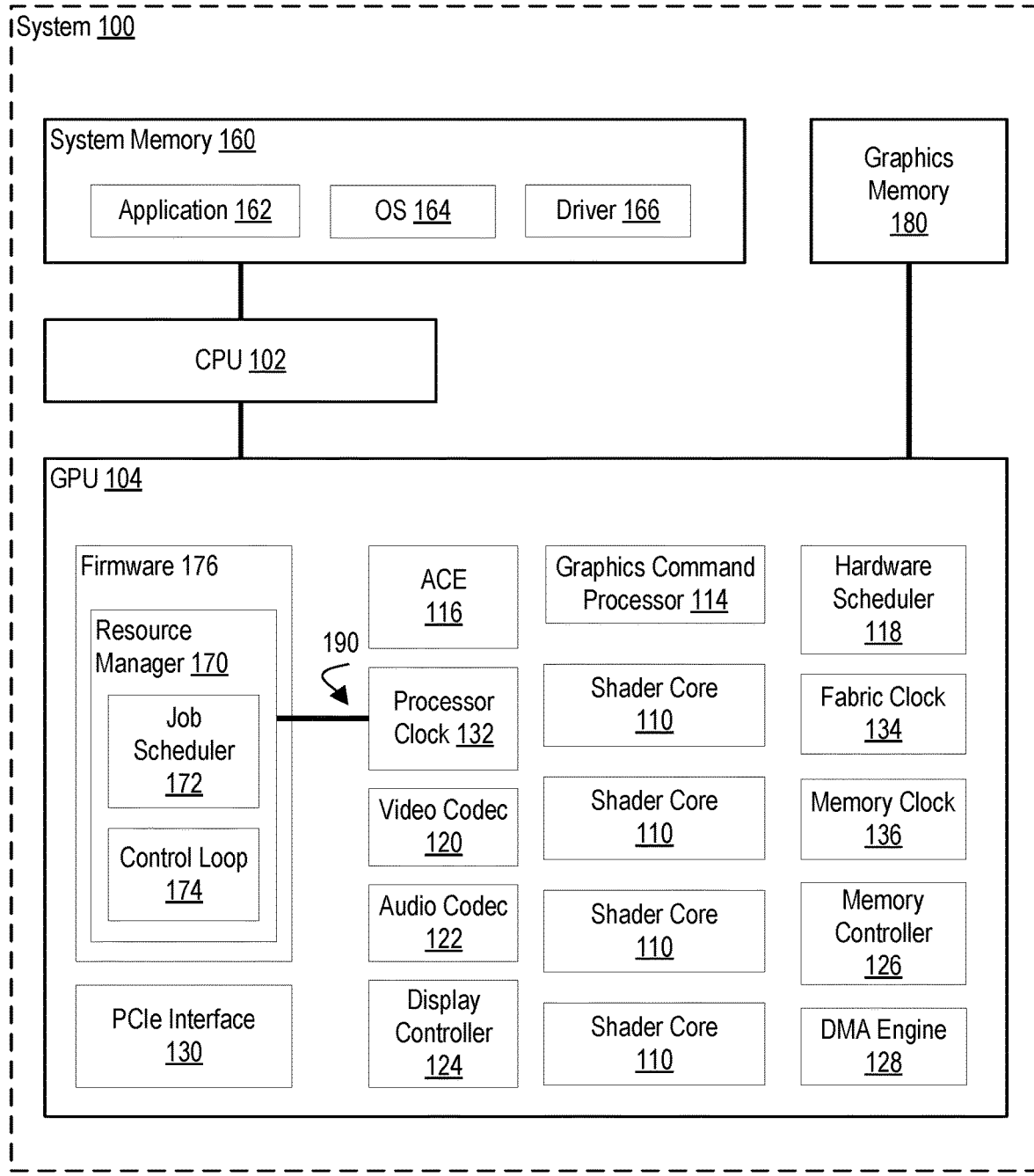
FIG. 1 sets forth a block diagram of an example system for scheduling and clock management for real-time system quality of service (QoS) in accordance with some implementations of the present disclosure.

Real-time tasks (e.g., media playback, teleconferencing, video capture, etc.) in an accelerated processing device, such as a graphics processing unit (GPU), typically have timing constraints which in turn map to the user experience. For example, when processing a video for playback, a decoder in a GPU needs to ensure that a frame of a video is decoded in time for the frame to be displayed at the correct presentation time. Further, that same video frame needs to be scaled and color space converted prior to display. Still further, an audio decoding task must be completed before the current frame is completely rendered. A failure to complete these tasks by the required time can introduce stutter in the video display as well as audio discontinuities during media playback. In addition to multimedia tasks, other tasks such as inking and virtual reality/augmented reality can also have time requirements that must be met to provide a good user experience. Thus, various workloads (e.g., a media playback workload) often have what is referred to here as a 'deadline.' Such a workload deadline is the time by which the workload must be completed to avoid a negative impact to the user experience. The user experience can be negatively impacted by the introduction of artifacts caused by missing these deadlines. The introduced artifact can be minor, such as a single dropped frame, or major, such as a long sequence of missed frames during the synchronization of video and audio.

One technique for guaranteeing quality of service (QoS) for real-time workloads is to dedicate hardware resources for handling these workloads. For example, a system carves out a particular number of compute units that are dedicated to handling real-time workloads. However, this can lead to inefficient use of resources when the platform is not fully utilizing the carved-out resources. For example, in a case where the number of compute units have more compute capability than needed, that extra compute capability is wasted.

Furthermore, clock control mechanisms can affect real time processing of workloads. For example, in some implementations, clock control mechanisms place constraints on the clock rate based on whether a device is running on battery power. In one example, if the device is running on battery power, the clock control mechanism can clamp the clock without guaranteeing that a workload can be executed in accordance with workload deadlines. However, a real-time workload might require more than the minimum clock speed to avoid discontinuities in user experience. In another example, when not running on battery power or in a low power mode, clock control mechanisms can increase the clock rate based on continuous utilization of hardware resources without a context for when work items must be completed and without consideration for the strain placed on other resources. Generally higher clocks lead to higher rail voltages and higher power consumption during the executed workload. Thus, there is a need to link clock management and job scheduling for real-time workloads, to improve the performance of the system (e.g., in terms of power management and efficient utilization of resources) as well as the user experience (e.g., the completion of real-time work items by a requisite deadline).

To that end, various implementations of methods for scheduling and clock management for real-time system QoS are described in this specification. Such a method includes determining a target work rate based on respective job deadlines of a plurality of jobs on a processing platform. The method also includes adjusting a clock rate of the processing platform based on at least the target work rate. In some implementations, the clock rate is adjusted to the lowest clock rate that can complete the jobs based on the target work rate and the respective job deadlines. In some examples, each of the plurality of jobs is a real-time job.

In some implementations, determining a target work rate based on respective job deadlines of a plurality of jobs on a processing platform includes ordering the plurality of jobs based on the respective deadlines, determining an amount of aggregate work required to reach each of the respective deadlines, identifying one deadline among the respective deadlines as a most constraining deadline based on the amount of work required to reach that one deadline, and determining the target work rate based on the most constraining deadline.

In some implementations, determining a target work rate based on respective job deadlines of a plurality of jobs on a processing platform includes identifying a normalization parameter for a job based on one or more characteristics of the job and applying the normalization parameter to a work size of the job.

In some implementations, determining a target work rate includes determining, in response to receiving a new job for the processing platform, the target work rate based on the respective job deadlines of the plurality of jobs on the processing platform. In these implementations, determining a target work rate also includes determining whether to preempt an in-progress job in response to receiving the new job.

In some implementations, determining a target work rate includes determining, in response to identifying that an existing job has completed on the processing platform, the target work rate based on the respective job deadlines of the plurality of on the processing platform.

In some implementations, adjusting a clock rate of the processing platform based on at least the target work rate includes identifying a completion rate at which work is being completed on the processing platform and driving the clock rate based on the difference between the target work rate and the completion rate.

In addition to the methods described above, various implementations of an apparatus for scheduling and clock management for real-time system QoS are also described in this specification. Such an apparatus includes a computer processor and a computer memory operatively coupled to the computer processor. The computer memory stores computer program instructions that, when executed by the computer processor, cause the apparatus to determine a target work rate based on respective job deadlines of a plurality of jobs on a processing platform and to adjust a clock rate of the processing platform based on at least the target work rate. In some implementations, the clock rate is adjusted to the lowest clock rate that can complete the jobs based on the target work rate and the respective job deadlines. In some examples, each of the plurality of jobs is a real-time job.

In some implementations, determining a target work rate based on respective job deadlines of a plurality of jobs on a processing platform includes ordering the plurality of jobs based on the respective deadlines, determining an amount of work required to reach each of the respective deadlines, identifying one deadline among the respective deadlines as a most constraining deadline based on the amount of work required to reach that one deadline, and determining the target work rate based on the most constraining deadline.

In some implementations, determining a target work rate based on respective job deadlines of a plurality of jobs on a processing platform includes identifying a normalization parameter for a job based on one or more characteristics of the job and applying the normalization parameter to a work size of the job.

In some implementations, determining a target work rate includes determining, in response to receiving a new job for the processing platform, the target work rate based on the respective job deadlines of the plurality of jobs on the processing platform. In these implementations, determining a target work rate also includes determining whether to preempt an in-progress job in response to receiving the new job.

In some implementations, determining a target work rate includes determining, in response to identifying that an existing job has completed on the processing platform, the target work rate based on the respective job deadlines of the plurality of on the processing platform.

In some implementations, adjusting a clock rate of the processing platform based on at least the target work rate includes identifying a completion rate at which work is being completed on the processing platform and driving the clock rate based on the difference between the target work rate and the completion rate.

Also described in this specification are various implementations of a computer program product for scheduling and clock management for real-time system QoS. The computer program product is disposed upon a computer readable medium and includes computer program instructions that, when executed, cause a computer to determine a target work rate based on respective job deadlines of a plurality of jobs on a processing platform and to adjust a clock rate of the processing platform based on at least the target work rate. In some implementations, the clock rate is adjusted to the lowest clock rate that can complete the jobs based on the target work rate and the respective job deadlines. In some examples, each of the plurality of jobs is a real-time job.

In some implementations, determining a target work rate based on respective job deadlines of a plurality of jobs on a processing platform includes ordering the plurality of jobs based on the respective deadlines, determining an amount of work required to reach each of the respective deadlines, identifying one deadline among the respective deadlines as a most constraining deadline based on the amount of work required to reach that one deadline, and determining the target work rate based on the most constraining deadline.

In some implementations, determining a target work rate based on respective job deadlines of a plurality of jobs on a processing platform includes identifying a normalization parameter for a job based on one or more characteristics of the job and applying the normalization parameter to a work size of the job.

In some implementations, determining a target work rate includes determining, in response to receiving a new job for the processing platform, the target work rate based on the respective job deadlines of the plurality of jobs on the processing platform. In these implementations, determining a target work rate also includes determining whether to preempt an in-progress job in response to receiving the new job.

In some implementations, determining a target work rate includes determining, in response to identifying that an existing job has completed on the processing platform, the target work rate based on the respective job deadlines of the plurality of on the processing platform.

In some implementations, adjusting a clock rate of the processing platform based on at least the target work rate includes identifying a completion rate at which work is being completed on the processing platform and driving the clock rate based on the difference between the target work rate and the completion rate.

The various implementations mentioned above will be described below in further detail with reference to the various drawings, beginning with FIG. 1. Like reference numerals refer to like elements throughout the specification and drawings. FIG. 1 sets forth a block diagram of an example system 100 for scheduling and clock management for real-time system QoS in accordance with some implementations of the present disclosure. The example system 100 of FIG. 1 can be implemented in a variety of computing devices. For example, the example system 100 can be implemented in a laptop or desktop personal computer, a server, a mobile device such as a smart phone or tablet, a gaming console, and so on. The example system 100 includes an graphics processing unit (GPU) 104, a central processing unit 102, and system memory 160. It will be appreciated by those of skill in the art that other systems can include additional GPUs, or can use other types of accelerated processing devices, without departing from the spirit of the present disclosure. In some implementations, the GPU 104 is a discrete GPU. In other implementations, the GPU 104 is a comprised in an accelerated processing unit (APU) that integrates the CPU and a GPU. In some implementations, the GPU 104 includes dedicated fixed function hardware components such as a codec or video processing engine.

In the example system 100 of FIG. 1, the example GPU 104 includes one or more shader cores 110 that include multiple single instruction multiple data (SIMD) compute units. The shader cores 110 can also include geometry processors, rasterizers, and other elements that are not shown here. The shader cores 110 receive graphics commands from a graphic command processor 114 included in the GPU and an asynchronous compute engine (ACE) 116. In some examples, the graphics command processor 114 and the ACE 116 each maintain separate queues for dispatching graphics work and compute work, respectively, to the shader cores 110.

The example GPU also includes a hardware scheduler 118 to accelerate scheduling through a driver interface. The example GPU 104 also includes hardware accelerators in the form of application specific integrated circuits or functional logic blocks such as a video encoder/decoder 120 (i.e., a "codec") for accelerated video encoding and decoding and an audio codec 122 for accelerated audio encoding and decoding, and a display engine 124 for accelerated display processing.

The example GPU 104 also includes memory controllers 126 and DMA engines 128 for accessing graphics memory 180, which can be, for example, a high bandwidth memory module (HBM). The example GPU 104 also includes a PCIe interface 130 for communicating with the CPU 102 and other system components via a PCIe link. The example GPU 104 also includes various storage structures such as caches, data shares, queues, and buffers not depicted here. Various processing engines (e.g., the cores 110 and codecs 120, 122) and components of the example GPU 104 communicate via an on-die fabric that is also not depicted here.

The example GPU 104 also includes at least one processor clock 132 used by some or all the processing engines for synchronizing instruction cycles. In some variations, different processing engines use different clocks. In some implementations, the processor clock has a base clock rate and headroom to boost the base clock rate during intensive processing. In some variations, the example GPU 104 includes a fabric clock 134 for synchronizing communication among components of the GPU. The GPU also synchronizes a memory clock 136 for communication with graphics memory 180.

In the example system 100 of FIG. 1, the system memory 160 (e.g., dynamic random access memory (DRAM)) hosts an operating system 164 for the CPU 102 that supports the execution of one or more applications 162 on the CPU 102. For example, the one or more applications 162 can be a graphics application, a multimedia application, a video editing application, a video conferencing application, a high-performance computing application, a machine learning application, or another application that takes advantage of the parallel nature and/or graphics and video capabilities of the GPU 104.

The applications 162 generate workloads that are executed on the GPU 104. Examples of workloads include graphics rendering workloads, transposing workloads, media playback workloads, machine learning workloads and the like. In an illustrative example, each workload is broken down into a number of jobs, each having a number of component tasks that are referred to here as 'work' or 'work items.' In this example, the term 'work' refers to one or a set of items to be executed by a processor including any of processes, waves, threads or instructions. A 'work rate' is the number of work items that can be completed by the processor in a time period. Considering an illustrative media playback workload as an example, one job is frame decode, another job is frame composition, another job is audio decode, and so on. These media playback jobs are repeated for each frame of the media playback workload. Thus, a work rate for this example media playback workload is the rate at which the work of each job is completed.

In some examples, different types of jobs are performed by different components of the GPU (e.g., shader engine, video codec, etc.). Various workloads are classified as real-time workloads or other types of workloads (e.g., low latency workloads) that have a QoS constraint. Such workloads are typically associated with work item deadlines, such as a time by which a composed frame of video or graphics should be ready for display. Other types of workloads (e.g., machine learning workloads, scientific compute workloads, etc.) may not have such real-time or QoS constraints. Readers of skill in the art will appreciate that the one or more applications can be variety of additional application types generating a variety of workload types, not all of which are identified here. However, the specific mention of application types and workload types within the present disclosure should not be construed as limiting application types and workload types to those that are identified here.

The system memory 160 also hosts a device driver 166 for the GPU 104 that provides an interface between the GPU 104 and the operating system 164 as well as the applications 162. The device driver 166 provides a mechanism for placing a workload on the GPU 104.

In some examples, the GPU 104 includes a resource manager 170 that receives jobs for workloads placed on the GPU 104 and allocates those jobs to processing components (e.g., cores, codecs, or other engines) on the GPU. In some implementations, the resource manager 170 is embodied as executable instructions stored in a read-only memory on the GPU 104 (i.e., firmware 176). In other implementations, the resource manager 170 is implemented as software included in the driver 166 in system memory 160. In still further examples, the resource manager 170 is implemented as a combination of software and firmware. In some examples, the resource manager 170 is implemented as part of the hardware scheduler 118.

In accordance with implementations of the present disclosure, the resource manager 170 manages work intake and job scheduling as well as clock management. In some examples, the resource manager 170 includes a job scheduler 172 that dispatches work to various queues for various processing components or pipeline stages. Dispatching the work may be based on various factors including, in some implementations, upon the priority level or deadline of the work.

The resource manager determines a target work rate based on respective job deadlines of jobs launched on the GPU 104. The 'target' work rate refers to the work rate at which the GPU should execute work items to meet the job deadlines. To determine the target work rate, the resource manager 170 orders the jobs based on each job's deadline. The resource manager 170 determines an aggregate amount of work required to reach each of the deadlines. As will be explained in further detail below, an aggregate amount of work is the amount of work of the job associated with the deadline plus the unexecuted work of all jobs associated with earlier deadlines. An amount of work can be quantified, for example, as number of work items including threads, processes, waves, output resolution, pixel information, and so on.

The resource manager 170 identifies the most constraining deadline from among the job's deadlines based on the amount of work required to reach that deadline. The resource manager 170 then determines the target work rate based on the most constraining deadline. In some implementations, the most constraining deadline is the deadline that requires the highest rate of work to reach that deadline, where the work to reach the deadline is the aggregate of the work of the job associated with the deadline and the unexecuted work of all jobs associated with earlier deadlines. In some variations, the work size of each job is normalized by identifying a normalization parameter based on one or more characteristics of the job and applying the normalization parameter to the work size of the job.

In some variations, the resource manager 170 determines the target work rate in response to receiving a new job for the GPU. In such examples, the resource manager 170 determines whether to preempt an in-progress job in response to receiving the new job. In some variations, the resource manager 170 determines the target work rate in response to identifying that an existing job has completed on the GPU.

In some implementations, the resource manager 170 identifies a completion rate at which work is being completed on the GPU and drives a clock rate using a control signal line 190 based on the difference between the target work rate and the completion rate. For example, control loop logic 174, such as logic for a proportional-integral-derivative control loop or a state space control loop, is employed by the resource manager to drive the clock rate. In some examples, the resource manager 170 including the job scheduler 172 and the control loop logic 174 are implemented as part of the hardware scheduler 118.

Figure 2:
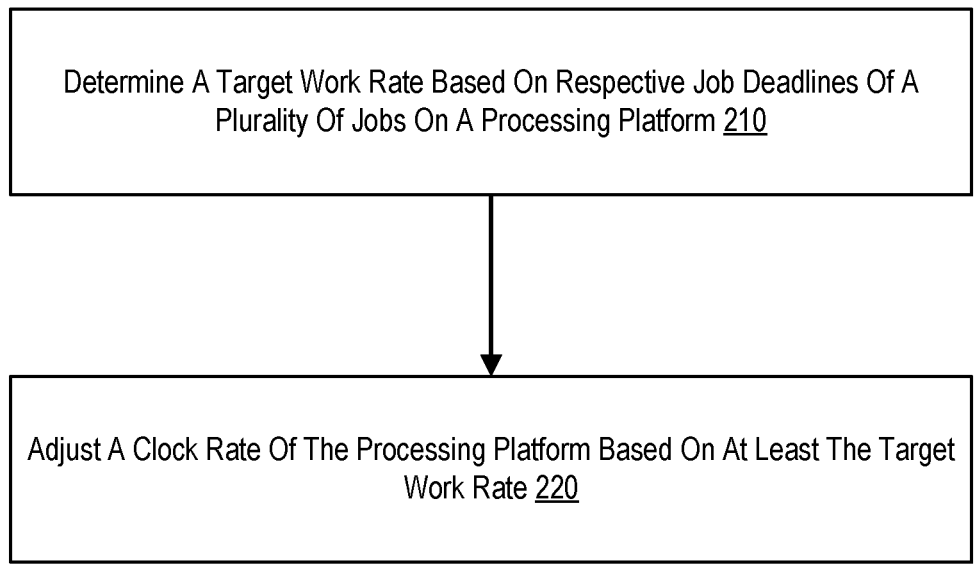
FIG. 2 sets forth a flow chart illustrating an example method of scheduling and clock management for real-time system QoS in accordance with some implementations of the present disclosure.

For further explanation, FIG. 2 sets forth a flow chart illustrating an example method of scheduling and clock management for real-time system QoS in accordance with some implementations of the present disclosure. The example method of FIG. 2 includes determining 210 a target work rate based on respective job deadlines of a plurality of jobs on a processing platform. In some implementations, determining 210 a target work rate based on respective job deadlines of a plurality of jobs on a processing platform is carried out by a resource manager (e.g., the resource manager 170 of FIG. 1) of a processing platform (e.g., the GPU 104 of FIG. 1). The resource manager can determine a target rate for completing an aggregate amount of work corresponding to one or more based on deadlines of the jobs.

In various examples, the resource manager is a component of a software driver (e.g., the driver 166 of FIG. 1) or implemented in firmware (e.g., firmware 176) of the processing platform. In some examples, the resource manager is implemented as a combination of software and firmware. When the driver receives a request by a workload initiator (e.g., the application 162 of FIG. 1) to launch a workload on the platform, the request includes a context that describes the workload and information for executing the workload. The context specifies hardware processing resources (e.g., a number of cores or compute units, a video encode/decode accelerator, etc.) to use in executing the workload, a number of threads, an output resolution or other pixel count information, video or audio compression standards (e.g., h.264, AV1, etc.), a frame rate, memory resources, and other information that will be recognized by those of skill in the art. In some variations, the description of the workload includes one or more workload types that further characterizes the workload and can be used for prioritizing and assigning hardware resources to the workload. For example, a workload type can specify that the workload is a real-time workload or not a real-time workload or can specify a priority level of the workload. In some variations, the workload type specifies the nature of the workload, such as a media playback workload, a machine learning workload, a transpose workload, a video conferencing workload, and so on.

In some implementations, determining 210 a target work rate based on respective job deadlines of a plurality of jobs on a processing platform includes quantifying an amount of work, or work size, represented by a job of the workload. In some variations, the work size is quantified based on the workload specifications provided in the context. For example, a workload can be quantified based on the number of work items including threads, processes, waves, an output resolution, pixel information, and so on. Thus, in some examples, the work size represents the anticipated utilization of one or more processing engines (e.g., a core, compute unit, shader, or codec) or other processing resources of the platform. The work size can also represents an amount of time to complete the job in dependence upon the utilization level of the processing engine. For example, a work size may include a job that requires 5 milliseconds at 100% utilization of a processing engine or 10 milliseconds at 50% utilization of the processing engine.

In some implementations, the workload characteristic used to quantify the work size represented by the job is determined dynamically, for example, based on the workload type and the size of the workload. For example, to quantify the work size of a media playback job, the amount of work can be quantified based on the number of pixels required to output video display information at the specified display output resolution. For example, h.264 decoding of 1080p video at 60 frames per second may require 5 milliseconds at 100% utilization of the video codec device or 10 milliseconds at 50% utilization of the video codec device. The utilization is also a function of the engine clock and the ability of the system to service shared resource requests (i.e., bandwidth and hence memory and fabric clocks). In some variations, the work size is determined heuristically based on the workload/job type and a profile for that workload/job type. In some implementations, a profile provides an estimation of the amount of work associated with a particular type of job.

In some implementations, determining 210 a target work rate based on respective job deadlines of a plurality of jobs on a processing platform also includes determining a deadline for the job. The deadline is the time by which the workload must be completed to ensure an acceptable QoS level and user experience. For example, in a video conferencing workload it might be acceptable to drop N number of frames in a time period, whereas in a media playback workload it is unacceptable to drop any frames in the same time period. An unacceptable QoS level is compensated by increasing clock rate or allocating more hardware resources. In various implementations, a deadline is described in absolute system time or an offset based on absolute system time. In some variations, a deadline for a job is determined heuristically by the resource manager based on workload characteristics. For example, where a workload context provides an output frame rate, the deadline for the job can be inferred from the frame rate. In other cases, a job deadline can be explicitly specified by the workload initiator (or by the operating system).

In some implementations, determining 210 a target work rate based on respective job deadlines of a plurality of jobs on a processing platform also includes determining a target rate for completing work such that an aggregate amount of work in one or more jobs can be completed while satisfying the deadlines of those jobs. In some cases, this results in some jobs completing early. As previously discussed, one conventional technique is to execute a job at the fastest possible rate to complete the workload, after which the processing engine can move on to the next job but can also sit idle until another workload is ready. In accordance with various implementations of the present disclosure, an aggregate amount of work is calculated for one or more jobs and a target work completion rate is calculated based on the aggregate amount of work as well as the amount of time available to complete the aggregate amount of work in view of the respective deadlines of the jobs. In other words, the resource manager determines the lowest possible steady work rate that can be employed to complete all for the work of one or more enqueued workloads while satisfying the respective deadlines of those workloads.

Consider a simple example of three enqueued jobs where job $J_1$ represents 5 units of work, job $J_2$ represents 15 units of work, and job $J_3$ represents 10 units of work, enqueued in that order. In this example, $J_1$, $J_2$, and $J_3$ all have a deadline that is 100 milliseconds from the current system time. Conventionally, each job might be performed at rate in accordance with the base clock rate, such that all three jobs complete within, for example, 30 milliseconds; or each job might be performed at rate in accordance with a low power clock rate with some QoS degradation. In accordance with implementations of the present disclosure, the aggregate work size for $J_1$, $J_2$, and $J_3$ is 30 units of work that must be completed within 100 milliseconds, resulting in a work rate of 0.3 units of work per millisecond that must be completed to satisfy the deadline without degrading QoS features. By contrast, completing all three jobs as quickly as possible at the base clock rate results in a work rate of 1 unit of work per millisecond for 30 milliseconds and then the processing engine is idle for 70 milliseconds if no other job is currently queued. Thus, the target work rate in accordance with the present disclosure represents an amortized amount of aggregate work and results in a lower work rate that can be maintained for multiple jobs with less impact on voltage, current leakage, and memory bandwidth. In some implementations, other types of jobs are merged through a priority-based scheme to allow for non-real-time jobs to be intermingled with real-time jobs. For example, where a thermal budget mechanism is employed, the non-real-time jobs are allotted the remaining thermal budget after the real-time jobs are satisfied.

The example method of FIG. 2 also includes adjusting 220 a clock rate of the processing platform based on at least the target work rate. In some implementations, adjusting 220 a clock rate of the processing platform based on at least the target work rate is carried out by the resource manager driving the clock rate to a new clock rate based on at least the target work rate. For example, if the most constraining deadline results in a target work rate that cannot be achieved by the current clock rate, the clock rate is adjusted to a faster rate to meet the target work rate. Conversely, if the most constraining deadline results in a target work rate can be surpassed at the current clock rate, the clock rate is adjusted to a slower rate to meet the target work rate. In this way, the job deadlines are met without unnecessary power consumption and thermal characteristics associated with higher clock rates. In other words, the clock rate is adjusted to the lowest clock rate that can complete the jobs based on the target work rate and the respective job deadlines. In some examples, the resource manager provides a control signal (e.g., the control signal line 190 of FIG. 1) to the clock (e.g., the processor clock 132) of the processing platform.

When considering an optimal operating state for power management, however, it is noted that an optimal system level power point is based on the complete system and not merely a minimum required clock rate. In some cases, a race-to-idle (RTI) mechanism is the best solution, for example, where getting the processing engines turned off and idle the maximum amount of time achieves the lowest power point. Implementations in accordance the present disclosure provide a lower bound for the clock rate required for real-time behavior to clearly define the working range available for finding the optimal system level power point while satisfying real-time workload requirements. Thus, in some examples, an RTI mechanism is used in conjunction with this lower bound to ensure that the system does not end up in a non-optimal operating point. It is further contemplated that a state space control mechanism that includes penalization, floor requirements, and system dynamics can provide a heuristic for reaching the optimal or near-optimal system level power point. Implementations in accordance with the present disclosure identify the lowest requirement for clocks, which can be used as an input to a state space control mechanism, as will be described in further detail below.

Figure 3:
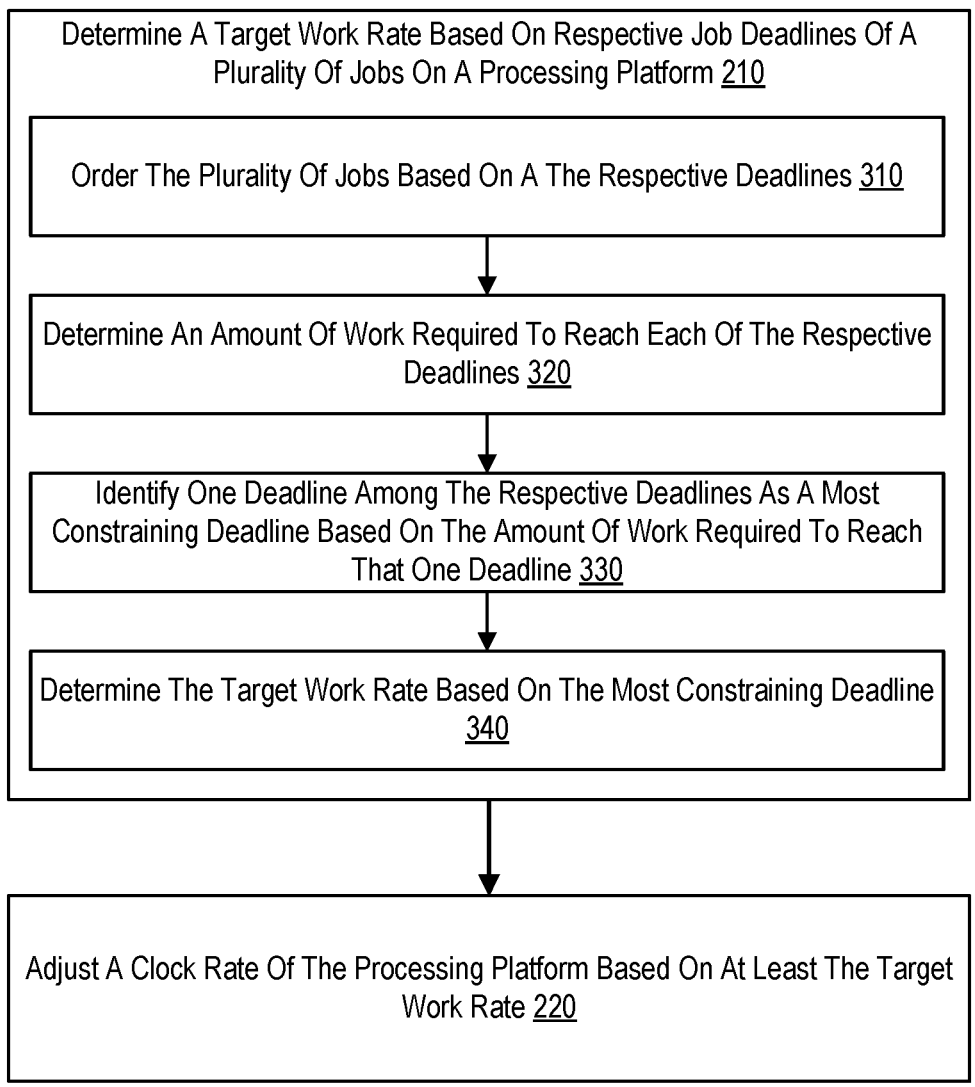
FIG. 3 sets forth a flow chart illustrating an example method of scheduling and clock management for real-time system QoS in accordance with some implementations of the present disclosure.

For further explanation, FIG. 3 sets forth the previous flow chart with further details of determining the target work rate in accordance with some implementations of the present disclosure. In the example method of FIG. 3, determining 210 the target work rate includes ordering 310 the plurality of jobs based on the respective deadlines. Ordering 310 the plurality of jobs based on the respective deadlines is, in some implementations, carried out based on the respective deadlines of the jobs (i.e., the job having the soonest deadline is placed first in the queue). In some examples, when a new job is added to a queue, the queue is reordered based on the deadline of the new job. Consider an example where three jobs $J_1$, $J_2$, and $J_3$ are currently in enqueued and where $J_1$ has a deadline of 00:00:00:050 (hour:minute:second:millisecond, or 50 milliseconds after midnight), $J_2$ has a deadline that is 00:00:00:030, and $J_3$ has a deadline that is 00:00:00:100 in system time. The resource manager orders the jobs from soonest to latest deadlines, or $J_2 \Rightarrow J_1 \Rightarrow J_3$. When a new job $J_4$ having a deadline of 00:00:00:015 is received, the queue is reordered as $J_4 \Rightarrow J_2 \Rightarrow J_1 \Rightarrow J_3$.

Determining 210 the target work rate also includes determining 320 an amount of work required to reach each of the respective deadlines. In some implementations, determining 320 an amount of work required to reach each of the respective deadlines is carried out by calculating the total amount of work preceding each deadline. In other words, if a job has a particular deadline, the amount of work to reach that deadline is the size of the job plus the size of all jobs having an earlier deadline. Continuing the above example, assume that $J_1$ represents 15 units of work, job $J_2$ represents 5 units of work, job $J_3$ represents 10 units of work, and job $J_4$ represents 3 units of work. Thus, the total amount of work needed to complete job $J_4$ by its deadline is total$(J_4)$=size$(J_4)$=3; the total amount of work needed to complete job $J_2$ by its deadline is total$(J_2)$=size$(J_4)$+size$(J_2)$=8; the amount of work needed to complete job $J_1$ by its deadline is total$(J_1)$=size$(J_4)$+size$(J_2)$+size$(J_1)$=23; and the amount of work needed to complete job $J_3$ by its deadline is total$(J_3)$=size$(J_4)$+size$(J_2)$+size$(J_1)$+size$(J_3)$=33.

After the amount of work is determined 320, the example method of FIG. 3 continues by identifying 330 one deadline among the respective deadlines as a most constraining deadline based on the amount of work required to reach that one deadline. In some implementations, identifying 330 the most constraining deadline is carried out by determining the deadline that requires the highest rate of work that the processing platform must consume to meet the deadline. Thus, the most constraining deadline is determined by finding a work rate R for each job $J_n$ where the work rate R=total$(J_n)/(d-t)$, and where total$(J_n)$ is the sum of the work size of all jobs up to the deadline d that is associated with job $J_n$, and where t is the current time. For the job that has the highest work rate, the deadline d associated with that job is the most constraining deadline. Continuing the above example, and assuming a current system time of 00:00:00:000, the work rate to complete job $J_4$ is R=total$(J_4)/(d-t)$=3 units/15 milliseconds=0.2 units/millisecond; the work rate to complete job $J_2$ is R=total$(J_2)/(d-t)$=8 units/30 milliseconds=0.2667 units/millisecond; the work rate to complete job $J_1$ is R=total$(J_1)/(d-t)$=23 units/50 milliseconds=0.46 units/millisecond; and the work rate to complete job $J_3$ is R=total$(J_3)/(d-t)$=33 units/100 milliseconds=0.3333 units/millisecond. Therefore, the most constraining job is $J_1$, having the most constraining deadline and requiring the highest work rate to complete the job and all preceding jobs by the deadline. While the units of time in the above example are provided in milliseconds for ease of explanation, it is contemplated that system timers, job completion times, and deadlines can be measured in microseconds or any other unit reflecting time.

Finally, the method of FIG. 3 includes determining 340 the target work rate based on the most constraining deadline. In some implementations, determining 340 the target work rate based on the most constraining deadline is carried out by selecting the work rate of the most constraining deadline as the target work rate. Continuing the above example, where $J_1$ has the most constraining deadline, the target work rate is selected to be 0.46 units/millisecond. The target work rate can then be compared to the current retire rate, and the difference is used to drive the clock rate of the processing platform.

Figure 4A:
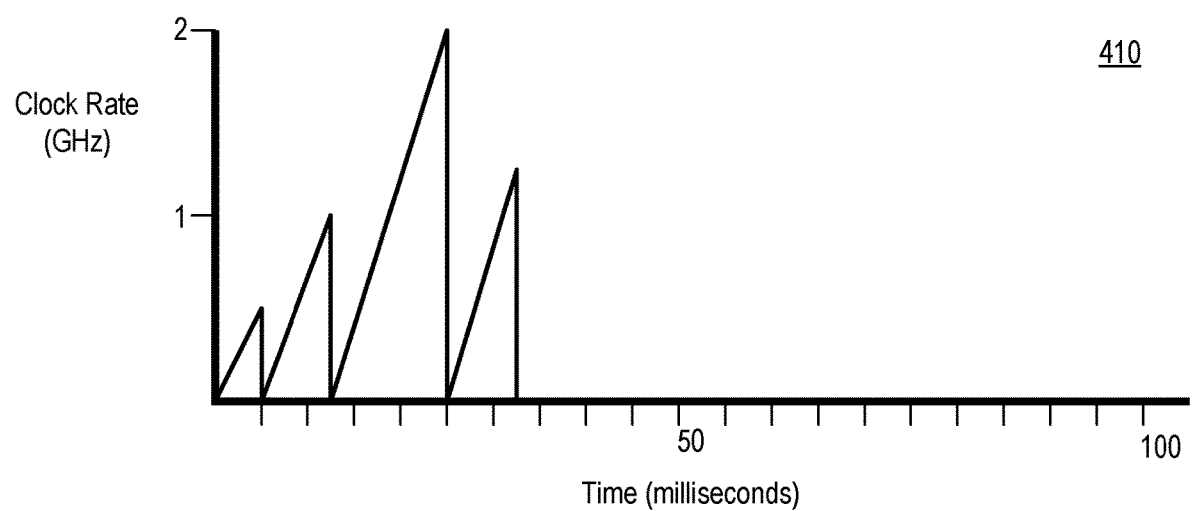
FIG. 4A sets forth an example graph of clock rate vs. time for an example group of jobs using a race-to-idle technique.

For further explanation, FIG. 4A sets forth an example graph 410 plotting clock rate versus time for four jobs represented by the four peaks. The graph 410 in FIG. 4A illustrates clock behavior using race-to-idle clock management in which, after a job is initiated, the clock rate continues to rise as the clock manager determines that the processing platform is continuously utilized. Upon job completion, the clock rate drops off and a new job is initiated, and the behavior is repeated. This results in a sawtooth pattern of clock rates that gives rise to poor power characteristics. Generally, a race to idle should go as fast as possible. Providing the workload is long enough, the sawtooth peaks depicted in FIG. 4A would flatten off at a maximum clock rate. However, there can be an upper bound that is not the highest clock rate possible but one dictated on the ability of the system to feed/consume data to/from the processing engine. Depending on the instantaneous system requirements, the system might not be able to run efficiently at peak clock rates. An ideal operating point would be somewhere between this upper bound and the bound determined by a fully amortized lowest required clock rate that is depicted in FIG. 4B in accordance with various implementations.

Figure 4B:
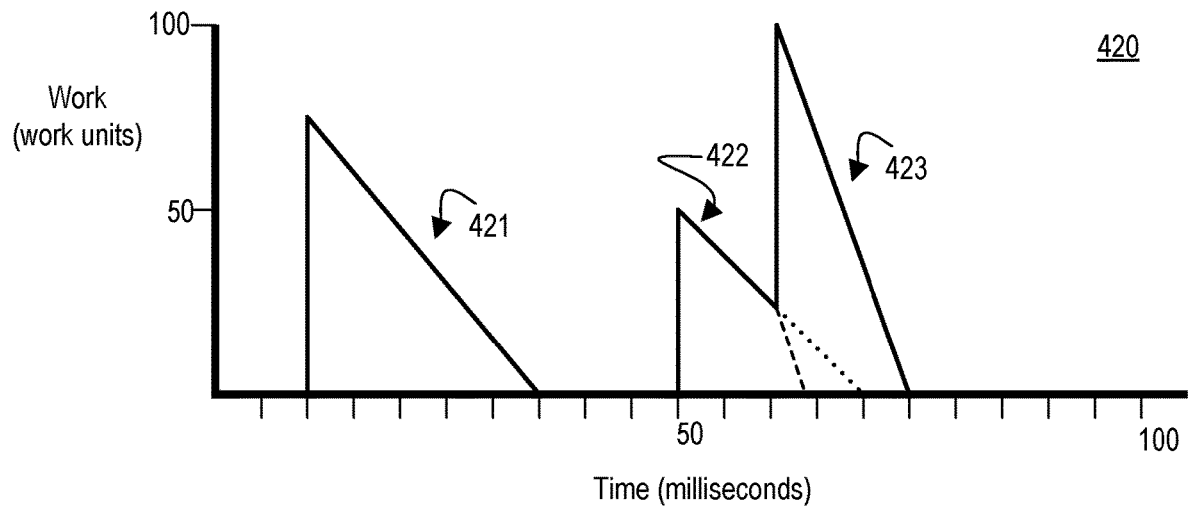
FIG. 4B sets forth an example graph of workload vs. time for another example group of jobs in accordance with some implementations of the present disclosure.

FIG. 4B sets forth an example graph 420 plotting work versus time in accordance with some implementations of the present disclosure. As illustrated by the graph 420 in FIG. 4B, a first job is added to the system and work is retired at a target rate equal to the slope of line 421 that will allow the job to complete by its deadline. After the first job completes, a second job is added to the system and work is retired at a target rate equal to the slope of line 422 that will allow the job to complete by its deadline. A third job is added to the system while the second job is in process and the third job has a more constraining deadline than the second job. The target work rate is increased to satisfy this deadline. The work of the second job and then the third job are retired at a rate equal to the slope of line 423. The difference between the slope of the dotted line and the slope of the dashed line represents the change in the target work rate when the third job is added to the system. That is, the dotted line represents the projected trajectory of line 422 (the work retire rate of the second job) before the third job is added to the system. After the third job is added to the system, the remaining work of the second job is retired at a rate equal to the slope of the dashed line which is equal to the slope of line 423.

Figure 4C:
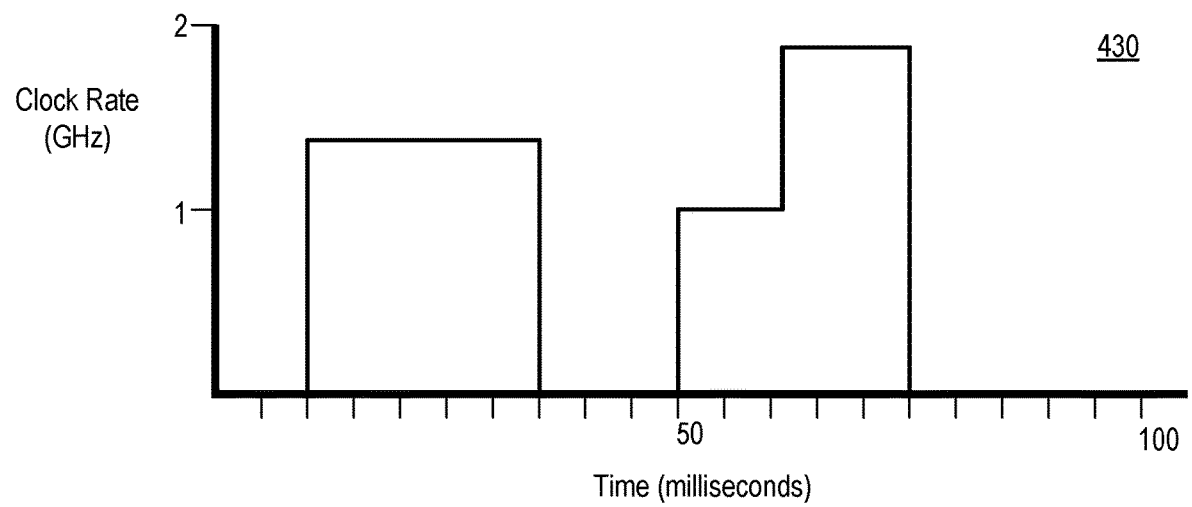
FIG. 4C sets forth an example graph of clock rate vs. time corresponding to the example of FIG. 4B in accordance with some implementations of the present disclosure.

FIG. 4C sets forth an example graph 430 plotting clock rate versus time for the example set forth in FIG. 4B in accordance with some implementations of the present disclosure. As illustrated by the graph 430 in FIG. 4C, when the first job is added to the system, the clock rate moves to the lowest clock rate that will allow the first job to complete on time. When the second job is added to the system, the clock rate moves to the lowest clock rate that will allow the second job to complete on time. When the third job is added to the system while the second job is in process, and the third job has a more constraining deadline than the second job, the clock rate moves to the lowest clock rate that will allow the second job and the third job to complete by the deadline of the third job. In some implementations, the difference between the target work rate trajectory and actual retire rate trajectory is used to drive a control loop (such as PID or state space) to achieve the results of FIG. 4C.

Figure 5:
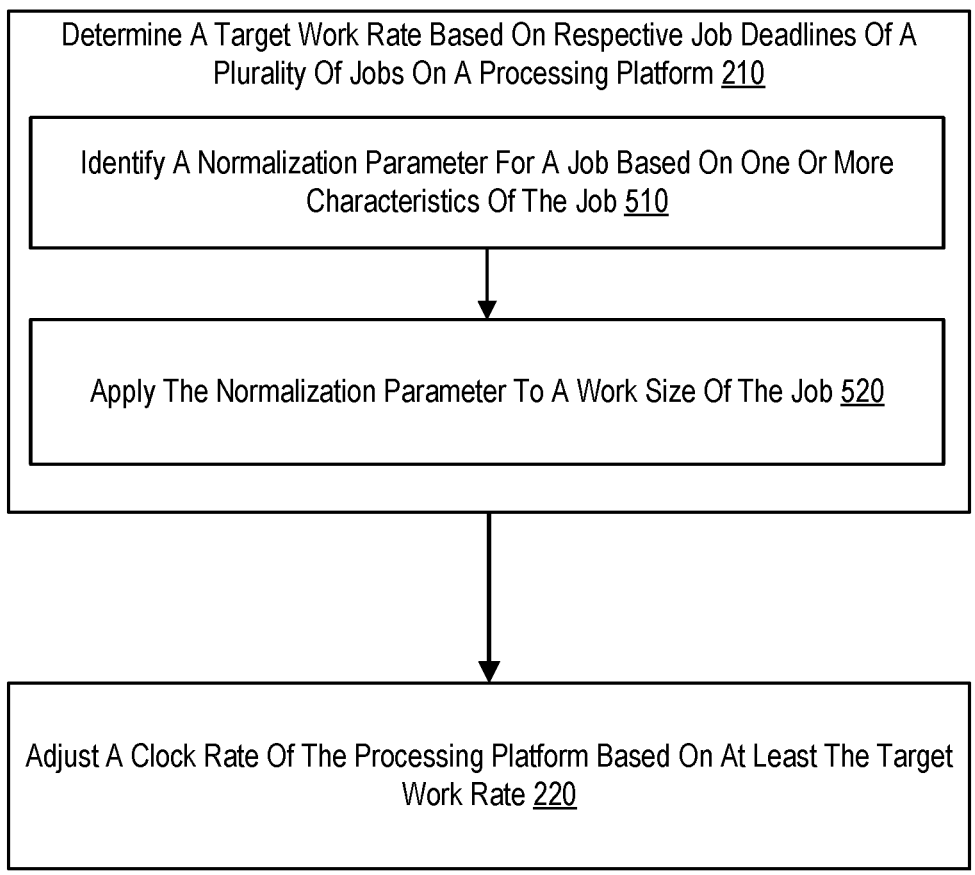
FIG. 5 sets forth a flow chart illustrating various methods of determining a target work rate in accordance with some implementations of the present disclosure.

For further explanation, FIG. 5 sets forth a flow chart of various methods of determining 210 a target work rate. In the example method of FIG. 5, determining 210 the target work rate includes identifying 510 a normalization parameter for a job based on one or more characteristics of the job. In some cases, a particular job is known to require more or less work to complete when compared to other jobs of the same size. For example, the size of a graphics job can be expressed in the number of threads or streams whereas the size of a video decode job can be expressed in the number of pixels, pixel rows, or macroblocks. However, it can be the case that the graphics job is known to require more work to complete than the video decode job. Thus, in such examples, a type of job (e.g., based on the type of resources utilized by the job) is associated with a rate at which the processing engine is estimated to progress through the work based on a profile for that type of job. In some implementations, this rate is measured in processing cycles or some other unit of progression through work.

Information about how a unit of work of one type of job compares to units of work of other types of jobs can be expressed and recorded as normalization parameters. For example, a normalization parameter can be used in a situation where differing jobs have a different work effort per unit of work and can be used to simplify the complexity of defining work. Consider an example where two shaders are running different workloads and execute a different number of compute cycles per thread submission. If thread submission is taken as the unit of work, a weight can be applied to this relative to the number of cycles required to execute the unit work. This normalization parameter is a relative weighting of the work units and can be used to balance the work, achieving a more uniform response. For example, these normalization parameters are recorded in a table or other data structure accessible by the resource manager. In some implementations, the normalization parameters are based on ongoing measurements and hence the system is self-adjusting.

In some implementations, identifying 510 a normalization parameter for a job includes identifying a characteristic of the job that is used to reference a table of normalization parameters. For example, the resource manager can identify a type of job (e.g., shading, video decode, video encode, audio decode, audio encode, video capture, etc.), hardware resources utilized by the job (e.g., a shader engine, video codec accelerator, audio codec accelerator, etc.), and/or processing characteristics of the job (e.g., video compression standard, audio compression standard, bitrate, etc.) as a characteristic for referencing a normalization parameter table. In some variations, such characteristics are identified from the context for the workload. The resource manager locates an entry in the table of normalization parameters that includes a normalization parameter associated with the job characteristic(s). In some examples, this parameter is expressed as a rate of progression through work or as a parameter relative to some baseline unit of work for a representative job. The normalization parameter can be a learned number that is related to how the system is completing the work. For example, in the case of a hypothetical kernel A and kernel B, kernel A is requires less processing cycles than kernel B and thus the normalization parameter balances these differences so that the clocks are more optimized.

After identifying 510 the normalization parameter, the method of FIG. 5 continues by determining 210 a target work rate based on respective job deadlines of a plurality of jobs on a processing platform also includes applying 520 the normalization parameter to a work size of the job. In one example, the normalization parameter is a factor by which the work size is multiplied. Thus, when calculating an amount of work that must be completed prior to a given job deadline, the work size of a job is adjusted in accordance with a normalization parameter. Consider an example where high dynamic range (HDR) display job takes 1.5× more clock cycles to complete than a standard dynamic range (SDR) display job. In this example, the normalization table reflects the rate of completion per unit of work for each type of job. When calculating an aggregate amount of work that includes both a HDR display job and an SDR display job, the resource manager extrapolates a normalization parameter from the rates of completion for each type of job and adjusts the work size of the jobs accordingly. In this example, the resource manager multiplies the work size of the graphics rendering job by 1.5.

The determination of the target work rate can be initiated as a result of a number of different occurrences, events, or at various times. To that end, FIG. 6 sets forth a flow chart illustrating various instances in which the determination 320 of the target work rate is initiated in accordance with implementations of the present disclosure.

In some implementations, the target work rate is recalculated each time a new job is placed on the processing platform. Accordingly, the method of FIG. 6 includes determining 602 the target work rate in response to receiving a new job for the processing platform. When a new job is received by the platform, the job is inserted in a queue based on the deadline as discussed above. If the new job has a deadline that is more constraining than the deadline used to determine the current target work rate, meaning that the deadline of the new job cannot be met at the current target work rate, a new target work rate is determined based on the deadline of the new job. That is, a work rate for the deadline of the new job is calculated by dividing the sum of the work sizes (or normalized work sizes) of all jobs having deadlines that precede the deadline of the new job plus the work size (or normalized work size) of the new job by the amount of time remaining before the deadline of the new job. If this work rate is higher than the current target work rate, the work rate is selected as the new target work rate. If the work rate is lower than the current target work rate, meaning that the deadline is not more constraining than the deadline used to determine the current target work rate, then no change is made to the current work rate.

Figure 6:
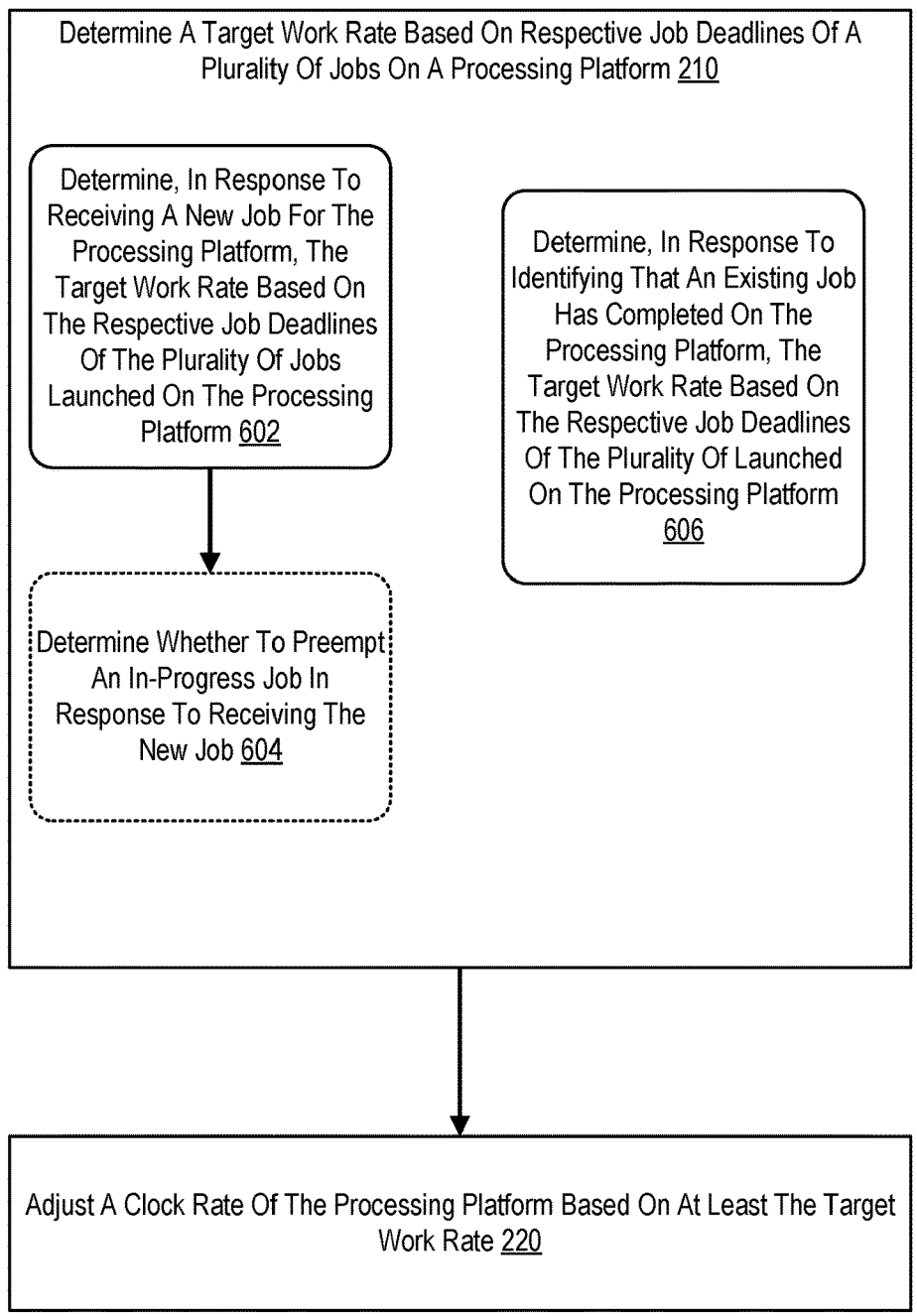
FIG. 6 sets forth a flow chart illustrating various instances in which the determination of the target work rate is initiated.

After initiating the determination of the target work rate as a response to receiving a new job, the method of FIG. 6 continues by, optionally, determining 604 whether to preempt an in-progress job in response to receiving the new job. In some implementations, determining 604 whether to preempt an in-progress job in response to receiving the new job is carried out by the resource manager determining whether the new job has a deadline that is now the most constraining deadline, as discussed above. If the new job has the most constraining deadline, the resource manager evaluates whether a currently executing job should be preempted in view of the new constraining deadline. For example, the resource manager evaluates the cost of continuing to execute the current in-progress job versus preempting it. In some cases, this includes the cost of a context switch in terms of time (e.g., how long it will take to save register states and context variables and to restore them when the preempted job is reinstated), the amount of work (i.e., processing time) remaining in the in-progress job, the dependencies of other processing engines on the in-progress job, and the constraints of other resources on the platform (e.g., memory bandwidth). In one example, the new job is part of a real-time workload and the in-progress job is not part of a real-time workload. When the resource manager determines that the in-progress job should be preempted, the new target work rate is determined based on the deadline of the new job.

Alternatively, or in addition, to recalculating the target work rate in response to receiving a new job, the target work rate can also be recalculated in response to completing a previous job. To that end, the target work rate in the example of FIG. 6 can also be determined 606 in response to identifying that an existing job has completed on the processing platform. If the deadline of the completed job was the basis for the current target work rate (i.e., the deadline of the completed job had the most constraining deadline), it is likely that the current target work rate is higher than needed to complete the remaining queued jobs by their respective deadlines. The new most constraining deadline is identified, as discussed above, from the queue jobs and a new target work rate is determined based on the new most constraining deadline. The new target work rate is used to adjust the clock rate to drive the clock rate lower and thus minimize power consumption.

Figure 7:
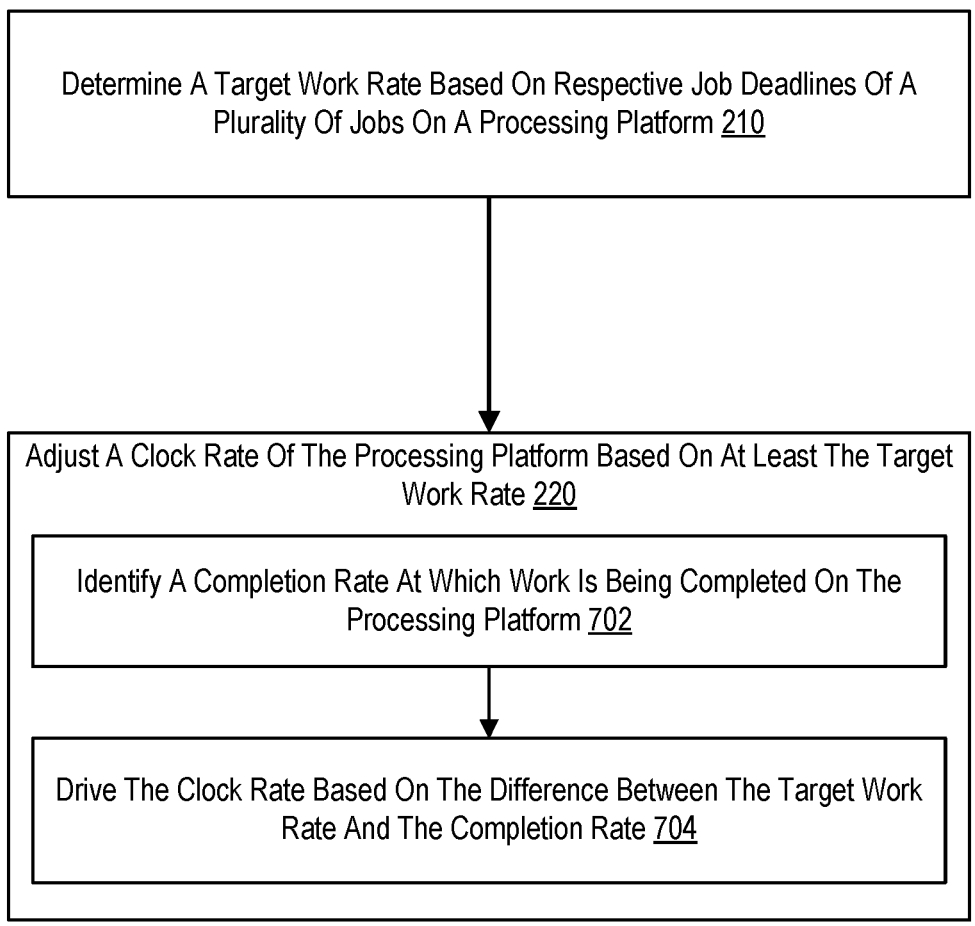
FIG. 7 sets forth a flow chart illustrating an example method of adjusting the clock rate of the processing platform based on the target work rate according to variations of the present disclosure.

For further explanation, FIG. 7 sets forth a flow chart illustrating an example method of adjusting 220 a clock rate of the processing platform based on at least the target work rate according to variations of the present disclosure. The method of FIG. 7 includes identifying 702 a completion rate at which work is being completed on the processing platform. In some implementations, identifying 702 a completion rate is carried out by inspecting an instruction retirement rate counter for the processing platform. The retirement rate counter reflects, for example, cycles per instruction or some other work completion metric.

In the example method of FIG. 7, adjusting 220 the clock rate of the processing platform also includes driving 704 the clock rate based on the difference between the target work rate and the completion rate. In some implementations, driving 704 the clock rate based on the difference between the target work rate and the completion rate is carried out by control loop logic (e.g., control loop logic 174 of FIG. 1). In one example, the control loop logic is implemented as a proportional-integral-derivative (PID) controller. In this example, the difference between the target work rate and the current work rate is used as an input to drive a control signal for the clock rate of the processing platform.

In another example, the control loop logic is implemented as a state space controller. In this example, additional variables such as the platform fabric clock and the memory clock are used as inputs to the control loop logic for generating a control signal based on the difference between the current work completion rate and the new target work rate. In this way, the resource manager accounts for the impact of adjusting the processor clock rate of the processing platform on other resources.

In view of the foregoing, consider an example where jobs are submitted each job has a specified work size (jobW) and deadline (jobD). The submitted jobs are ordered by deadline, 0–n. The aggregate candidate target rate at n is computed as candidate_targetR $(x)=\Sigma_{x=0}^{n}$jobW(x)/jobD(n). W(0) is the amount of work remaining of the currently executing job. W(1) . . . W(n) are related to queued jobs. In a system that supports preemption, the currently executing job could be re-queued allowing a more constraining task to be executed. The target rate is calculated as targetR=max(candidate_targetR(0), candidate_targetR(1), . . . candidate_targetR(n)). This is the tightest current constraint of all submitted jobs. As the workload executes, the actual work retirement rate is computed as workRetirementRate=realWork/deltaTime which reflects the rate of work being done. The delta of the targetR−workRetirementRate can be the input into a control loop logic (e.g., a PID or state space are examples) that derives the appropriate minRequiredClock necessary to complete on time. It should also be assumed that while this describes the behavior related to real-time jobs to determine the required floor clocks, the system can have other jobs posted.

It is noted that in some cases it is beneficial to run at a clock higher than the prescribed clock defined by the described mechanisms; for example, when the system can run at higher rates and complete early such that the overall energy consumed is less. This can be the case when the workload requirements are small. In some cases, there are mixed real-time and non real-time workloads. In such cases, the determined clock rates might not be the actual clocks but the required portion of the clocks required to handle the real-time workloads. In one example, additional constraints can be applied in the control loop logic, such as penalization, that can allow for higher clock rates. In another example, a penalty can be applied to the decision to preempt. In these examples, a state space controller is utilized to allow for adding penalization terms.

In view of the foregoing, implementations in accordance with the present disclosure provide several advantages. In various implementations, by providing the context of the work to a resource manager that includes resource and scheduling management as well as clock management, the system can adjust to the workload rather than "guessing" the best thing to do. The resource manager provides the ability to drive the system to the lowest power operating point that can support the workload without sacrificing QoS constraints. Furthermore, rather than allocating resources specifically to handle real-time workloads leading to underutilization of those resources for non-real-time workloads, the real-time system provided by the resource manager allows all hardware processing resources to be available all the time to both real-time and non-real-time workloads to make the most efficient use of these resources. Various implementations optimally adjust to the requirement and runtime behavior of the workload. For example, if applied to a decode job that experiences different overhead depending upon the frame type, the resource manager would adjust to that automatically. Tying clock management to a work rate trajectory abstracts the details about the workload such that the system can adjust. Normalization allows for the case where dissimilar workloads are described using the same definition of work that might have different weightings.

Implementations can be a system, an apparatus, a method, and/or logic circuitry. In various implementations, computer readable program instructions in the present disclosure are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some implementations, electronic circuitry including, for example, programmable logic circuitry, field-programmable gate arrays (FPGA), or programmable logic arrays (PLA) execute the computer readable program instructions by utilizing state information of the computer readable program instructions.

Aspects of the present disclosure are described herein with reference to flowchart illustrations and/or block diagrams of methods, apparatus (systems), and logic circuitry according to some implementations of the disclosure. It will be understood that each block of the flowchart illustrations and/or block diagrams, and combinations of blocks in the flowchart illustrations and/or block diagrams, can be implemented by logic circuitry.

In various implementations, logic circuitry is implemented in a processor, other programmable data processing apparatus, or other device to cause a series of operational steps to be performed on the processor, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and logic circuitry according to various implementations of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

While the present disclosure has been particularly shown and described with reference to implementations thereof, it will be understood that various changes in form and details can be made therein without departing from the spirit and scope of the following claims. Therefore, the implementations described herein should be considered in a descriptive sense only and not for purposes of limitation. The present disclosure is defined not by the detailed description but by the appended claims, and all differences within the scope will be construed as being included in the present disclosure.

What is claimed is:

1. A method of scheduling and clock management for real-time system quality of service (QOS), the method comprising:
   determining a target work rate based on a most constraining deadline among respective job deadlines of a plurality of jobs on a processing platform, wherein the most constraining deadline is a job deadline that requires a highest rate of work to reach that job deadline based on an amount of unexecuted work associated with the job deadline and earlier job deadlines; and
   adjusting a clock rate of the processing platform based on at least the target work rate.

2. The method of claim 1, wherein the clock rate is adjusted to a lowest clock rate that can complete the jobs based on the target work rate and the respective job deadlines.

3. The method of claim 1, wherein each of the plurality of jobs is a real-time job.

4. The method of claim 1, wherein determining a target work rate based on a most constraining deadline among respective job deadlines of a plurality of jobs on a processing platform includes:
   ordering the plurality of jobs based on the respective deadlines;
   determining an amount of work required to reach each of the respective deadlines;
   identifying a rate of work for each deadline based on the amount of work required to reach that deadline; and
   selecting the rate of work of the most constraining deadline as the target work rate.

5. The method of claim 1, wherein determining a target work rate based on a most constraining deadline among respective job deadlines of a plurality of jobs on a processing platform includes:
   identifying a normalization parameter for a job based on one or more characteristics of the job; and
   applying the normalization parameter to a work size of the job.

6. The method of claim 1, wherein determining a target work rate based on a most constraining deadline among respective job deadlines of a plurality of jobs on a processing platform includes:
   determining, in response to receiving a new job for the processing platform, the target work rate based on the respective job deadlines of the plurality of jobs on the processing platform.

7. The method of claim 6, further comprising:
   determining whether to preempt an in-progress job in response to receiving the new job.

8. The method of claim 1, wherein determining a target work rate based on a most constraining deadline among respective job deadlines of a plurality of jobs on a processing platform includes:
   determining, in response to identifying that an existing job has completed on the processing platform, the target work rate based on the respective job deadlines of a remainder of the plurality of jobs on the processing platform.

9. The method of claim 1, wherein adjusting a clock rate of the processing platform based on at least the target work rate includes:
   identifying a completion rate at which work is being completed on the processing platform; and
   driving the clock rate based on a difference between the target work rate and the completion rate.

10. An apparatus comprising:
    a computer processor; and
    a computer memory operatively coupled to the computer processor, the computer memory having disposed therein computer program instructions that, when executed by the computer processor, cause the apparatus to carry out:
    determining a target work rate based on a most constraining deadline among respective job deadlines of a plurality of jobs on a processing platform, wherein the most constraining deadline is a job deadline that requires a highest rate of work to reach that job deadline based on an amount of unexecuted work associated with the job deadline and earlier job deadlines; and
    adjusting a clock rate of the processing platform based on at least the target work rate.

11. The apparatus of claim 10, wherein determining a target work rate based on a most constraining deadline among respective job deadlines of a plurality of jobs on a processing platform includes:
    ordering the plurality of jobs based on the respective deadlines;
    determining an amount of work required to reach each of the respective deadlines;
    identifying a rate of work for each deadline based on the amount of work required to reach that deadline, wherein the rate of work is a steady rate of work; and
    selecting the work rate of the most constraining deadline as the target work rate.

12. The apparatus of claim 10, wherein determining a target work rate based on a most constraining deadline among respective job deadlines of a plurality of jobs on a processing platform includes:
  identifying a normalization parameter for a job based on one or more characteristics of the job; and
  applying the normalization parameter to a work size of the job.

13. The apparatus of claim 10, wherein determining a target work rate based on a most constraining deadline among respective job deadlines of a plurality of jobs on a processing platform includes:
  determining, in response to receiving a new job for the processing platform, the target work rate based on the respective job deadlines of the plurality of jobs on the processing platform.

14. The apparatus of claim 13, further comprising:
  determining whether to preempt an in-progress job in response to receiving the new job.

15. The apparatus of claim 10, wherein determining a target work rate based on a most constraining deadline among respective job deadlines of a plurality of jobs on a processing platform includes:
  determining, in response to identifying that an existing job has completed on the processing platform, the target work rate based on the respective job deadlines of a remainder of the plurality of jobs on the processing platform.

16. The apparatus of claim 10, wherein adjusting a clock rate of the processing platform based on at least the target work rate includes:
  identifying a completion rate at which work is being completed on the processing platform; and
  driving the clock rate based on a difference between the target work rate and the completion rate.

17. A computer program product for scheduling and clock management for real-time system quality of service (QOS), the computer program product comprising a non-transitory computer readable medium having stored thereon computer program instructions that, when executed, cause a computer to carry out:
  determining a target work rate based on a most constraining deadline among respective job deadlines of a plurality of jobs on a processing platform, wherein the most constraining deadline is a job deadline that requires a highest rate of work to reach that job deadline based on an amount of unexecuted work associated with the job deadline and earlier job deadlines; and
  adjusting a clock rate of the processing platform based on at least the target work rate.

18. The computer program product of claim 17, wherein determining a target work rate based on a most constraining deadline among respective job deadlines of a plurality of jobs on a processing platform includes:
  ordering the plurality of jobs based on the respective deadlines;
  determining an amount of work required to reach each of the respective deadlines; identifying a rate of work for each deadline based on the amount of work required to reach that deadline, wherein the amount of work includes uncompleted work associated with a job corresponding to the job deadline and uncompleted work associated with jobs corresponding to earlier job deadlines; and
  selecting the rate of work of the most constraining deadline as the target work rate.

19. The computer program product of claim 17, wherein adjusting a clock rate of the processing platform based on at least the target work rate includes:
  identifying a completion rate at which work is being completed on the processing platform; and
  driving the clock rate based on a difference between the target work rate and the completion rate.

20. The computer program product of claim 17, wherein the clock rate is adjusted to a lowest clock rate that can complete the jobs based on the target work rate and the respective job deadlines.

* * * * *